US007562145B2

(12) United States Patent
Aiken, Jr. et al.

(10) Patent No.: US 7,562,145 B2
(45) Date of Patent: Jul. 14, 2009

(54) APPLICATION INSTANCE LEVEL WORKLOAD DISTRIBUTION AFFINITIES

(75) Inventors: John Andrew Aiken, Jr., Raleigh, NC (US); Sue Huang, Raleigh, NC (US); Mark William McClintock, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 10/650,944

(22) Filed: Aug. 28, 2003

(65) Prior Publication Data

US 2005/0050202 A1  Mar. 3, 2005

(51) Int. Cl.
G06F 15/177 (2006.01)
G06F 15/173 (2006.01)
G06F 15/16 (2006.01)
G06F 11/00 (2006.01)

(52) U.S. Cl. ............... 709/227; 709/220; 709/221; 709/223; 709/228; 714/1; 714/2; 714/100

(58) Field of Classification Search ......... 709/227–229, 709/226, 203, 223–225, 220–221; 714/1–2, 714/100
See application file for complete search history.

(56) References Cited

U.S. PATENT DOCUMENTS

| 4,403,286 A | 9/1983 | Fry et al. ............... 364/200 |
| 4,495,570 A | 1/1985 | Kitajima et al. ......... 364/200 |
| 4,577,272 A | 3/1986 | Ballew et al. ............ 364/200 |
| 5,031,089 A | 7/1991 | Liu et al. ................ 364/200 |
| 5,563,878 A | 10/1996 | Blakeley et al. ............ 370/60 |
| 5,675,739 A | 10/1997 | Eilert et al. ............ 395/200 |
| 5,774,660 A | 6/1998 | Brendel et al. ........ 395/200.31 |
| 5,917,997 A | 6/1999 | Bell et al. ............ 395/182.02 |
| 5,923,854 A | 7/1999 | Bell et al. ............ 395/200.73 |
| 5,935,215 A | 8/1999 | Bell et al. ................ 709/239 |
| 5,951,650 A | 9/1999 | Bell et al. ................ 709/238 |
| 6,006,264 A | 12/1999 | Colby et al. ............. 709/226 |
| 6,061,807 A * | 5/2000 | Albert et al. ............... 714/3 |
| 6,374,300 B2 | 4/2002 | Masters ................. 709/299 |
| 6,424,992 B2 * | 7/2002 | Devarakonda et al. ..... 709/203 |

(Continued)

OTHER PUBLICATIONS

IBM Software Announcement, "Preview: IBM Interactive Session Support/Network Dispatcher—Enhanced to Help you Maximize the Potential of the Internet," Dec. 10, 1996, Announcement Letter: 296-497.

(Continued)

Primary Examiner—Nathan J Flynn
Assistant Examiner—Joshua Joo
(74) Attorney, Agent, or Firm—Stevens & Showalter LLP (57) ABSTRACT

Connections from a client to respective ones of a plurality of application instances that receive data from a shared communication protocol stack are assigned by defining an affinity between the client and a corresponding one of the plurality of application instances. Connection requests received from the client at the shared communication protocol stack are assigned to the corresponding one of the plurality of application instances if an affinity is defined between the client and the corresponding one of the plurality of application instances. Connection requests received from the client at the shared communication protocol stack are distributed to selected ones of the plurality of application instances if an affinity is not defined between the client and the corresponding one of the plurality of application instances.

6 Claims, 7 Drawing Sheets

U.S. PATENT DOCUMENTS

| | | | |
|---|---|---|---|
| 6,425,014 B1 | 7/2002 | Aiken, Jr. et al. | 709/230 |
| 6,430,622 B1 | 8/2002 | Aiken, Jr. et al. | 709/245 |
| 6,581,088 B1* | 6/2003 | Jacobs et al. | 718/105 |
| 7,003,574 B1* | 2/2006 | Bahl | 709/228 |
| 7,024,582 B2* | 4/2006 | Loy et al. | 714/4 |
| 7,146,532 B2* | 12/2006 | McCabe | 714/15 |
| 2002/0124013 A1* | 9/2002 | Loy et al. | 707/204 |
| 2002/0124089 A1 | 9/2002 | Aiken, Jr. et al. | 709/227 |
| 2002/0143953 A1 | 10/2002 | Aiken, Jr. et al. | 709/227 |
| 2002/0143954 A1 | 10/2002 | Aiken, Jr. et al. | 709/227 |
| 2002/0143965 A1 | 10/2002 | Aiken, Jr. et al. | 709/229 |
| 2002/0152423 A1* | 10/2002 | McCabe | 714/15 |
| 2002/0152429 A1* | 10/2002 | Bergsten et al. | 714/43 |
| 2002/0178265 A1 | 11/2002 | Aiken, Jr. et al. | 709/227 |
| 2002/0178268 A1 | 11/2002 | Aiken, Jr. et al. | 709/228 |
| 2003/0014526 A1* | 1/2003 | Pullara et al. | 709/227 |
| 2003/0167331 A1* | 9/2003 | Kumar et al. | 709/227 |
| 2004/0267920 A1* | 12/2004 | Hydrie et al. | 709/223 |
| 2005/0055435 A1* | 3/2005 | Gbadegesin et al. | 709/224 |
| 2005/0249199 A1* | 11/2005 | Albert et al. | 370/352 |
| 2005/0265346 A1* | 12/2005 | Ho et al. | 370/392 |
| 2007/0174660 A1* | 7/2007 | Peddada | 714/4 |

OTHER PUBLICATIONS

Chris Gage, "WebSpere Edge Server Version 1.0.3 Load Balancer, Scalability, Availability and Load-Balancing for TCP/IP Applications," IBM Corporation White Paper, Feb. 2001.

Rob Schreier Hohman, "A Market Ready to Cache Fire"? *Network World*, Oct. 19, 1998.

"ArrowPoint—When Web Performance is Your Business™", *InternetWeek.com*, Oct. 21, 1999.

Wei-Jyh Lin et al., "A Database Application Generator for the WWW," *Journal of the Chinese Institute of Engineers*, vol. 21, No. 3, pp. 337-346 (1998).

Hunt et al., "Enabling Content-Based Load Distribution for Scalable Services," IBM T.J. Watson Research Center, Yorktown Heights, NY 10598.

Pai et al., "Locality-Aware Request Distribution in Cluster-Based Network Servers," ASPLOS VIII Oct. 1998.

Caruso, Jeff "Resonate Sticks its Hand in the 'Cookie' Jar", *Network World*, Dec. 6, 1999.

Wu, Cheng, "What is Web Switching?", *Network World Technology Update*.

Chwodhry, Pankaj, "Alteon Saves Loads of Time," *PC Week*, 50, 15, Dec. 14, 1998.

"it's Raining Load Balancing Devices," *Network World*, V.15, n50, Dec. 14, 1998.

A. Dahlin et al. *EDDIE A Robust and Scalable Internet Server*. Ericsson Telecom AB, Stockholm, Sweden (May 1998).

Brochure entitled, *ACEdirector™ 8-Port 10/100 MBPS Ethernet Switch*. Alteon WebSystems, San Jose, CA ( 1999).

Brochure entitled, *Enhancing Web User Experience with Global Server Load Balancing*. Alteon WebSystems, San Jose, CA (Jun. 1999).

Brochure entitled, *The Next Step in Server Load Balancing*. Alteon WebSystems, San Jose, CA (Nov. 1999).

Mac Devine. Presentation entitled, *TCP/IP Application Availability and Workload Balancing in the Parallel Sysplex*. Share Technical Conference (Aug. 22-27, 1999).

http://w3.enterlib.ibm.com:80/cgi-bin/bookmgr/books/F1AF7001/1.3.1.2; *1.3.1.2.5 Virtual IP Addressing (VIPA)*; Excerpt from IP Configuration for OS/390, pp. 1-4 (1998).

http://w3.enterlib.ibm.com:80/cgi-bin/bookmgr/books/F1AF7001/1.3.2; *1.3.20 Device and Link Statement—Virtual Devices (VIPA)*; Excerpt from IP Configuration for OS/390, pp. 1-3 (1998).

http://we.enterlib.ibm.com:80/cgi-bin/bookmgr/books/F1AF7001/1.3.2; *1.3.23. Home Statement*; Excerpt from IP Configuration for OS/390, pp. 1-6 (1998).

Pai et al. *Locality-Aware Request Distribution in Cluster-based Network Servers*. Proceedings of the 8th International Conference on Architectural Support for Programming Languages and Operating Systems (ASPLOS VIII), San Jose, CA, Oct. 1998.

Aron et al. "Scalable Content-aware Request Distribution in Cluster-based Network Servers." Proc. of the 2000 Annual Usenix Technical Conference, San Diego, CA, Jun. 2000.

Aron et al. "Efficient Support for P-HTTP in Cluster-Based Web Servers." Proc. of 1999 Annual Usenix Technical Conference, Monterey, CA, Jun. 1999.

Aron, Mohit. "Scalable Content-aware Request Distribution in Cluster-based Network Servers." http://softlib.rice.edu/softlib/scalableRD.html. Department of Computer Science, Rice University.

"Data Communications Awards Allot Communications 'Hot Product' in Internetworking/IP Tools Category." Press Bulletin. Los Gatos, CA, Jan. 18, 1999.

"Allot Introduces Turnkey Next Generation IP Service and Creation Solution—the Virtual Bandwidth Manager." Press Bulletin. Atlanta, GA, SUPERCOMM 2000, Booth #8458, Jun. 5, 2000.

"Allot Announces the General Availability of its Directory Services-Based NetPolicy™ Manager." Press Bulletin. Tel Aviv, Israel, Feb. 28, 2000.

"Allot Communications Announces the Netenforcer Family of IP Traffic Management Products: Fault-Tolerant, Scaleable, Policy-Based Bandwidth Management, QOS, SLA Solutions." Press Bulletin. Burlingame, CA, Dec. 13, 1999.

"Allot Communications Announces Business-Aware Network Policy Manager." Press Bulletin. Sophia Antipolis, France, Sep. 20, 1999.

U.S. Appl. No. 09/640,409 to Aiken et al, entitled "Methods, Systems and Computer Program Products for Workload Distribution," filed Aug. 17, 2000.

"Allot Communications Announces Directory Services Based Network Policy Manager." Press Bulletin. Los Gatos, CA, Apr. 5, 1999.

"Allot Communications Launches NetEnforcer with NetWizard, the Fastest Way to Implement Accurate and Reliable Network QoS Policies." Press Bulletin. Burlingame, CA, Jan. 25, 2001.

"Policy-Based Network Architecture." from www.allot.com, pp. 1-11.

"V1R5: Timed Server Affinity," Portion of Presentation to Royal Bank of Canada Under Confidential Disclosure Agreement, Aug. 15, 2002.

Taylor, Art, "Java-Charging the Data Warehouse (Java Applications for Data Warehousing)," *Database Programming & Design*. vol. 10, No. 10, Oct. 1997.

Lin et al. "A Database Application Generator for the WWW," *Journal of the Chinese Institute of Engineers*. vol. 21, No. 3, pp. 337-346 (1998).

G. Shachor, *Maintaining HTTP Session Affinity in a Cluster Environment*, U.S. Appl. No. 09/562,375, filed May 1, 2000.

* cited by examiner

APPLICATION INSTANCE LEVEL WORKLOAD DISTRIBUTION AFFINITIES

FIELD OF THE INVENTION

The present invention relates to workload distribution among data processing systems and more particularly to workload distribution between multiple instances of an application.

BACKGROUND OF THE INVENTION

The Internet Protocol ("IP") is designed as a connection-less protocol. Therefore, IP workload balancing solutions treat every Transmission Control Protocol ("TCP") connection request to a particular application, identified by a particular destination IP address and port number combination, as independent of all other such TCP connection requests. Examples of such IP workload balancing systems include Sysplex Distributor from the International Business Machines Corporation ("IBM"), which is included in IBM's z/OS and OS/390 TCP/IP implementations, and the Multi-Node Load Balancer ("MNLB") from Cisco Systems, Inc. Workload balancing solutions such as these use relative server capacity (and, in the case of Sysplex Distributor, also network policy information and quality of service considerations) to dynamically select a server to handle each incoming connection request. However, some applications require a relationship between a particular client and a particular server to persist beyond the lifetime of a single interaction (i.e. beyond the connection request and its associated response message).

Web applications are one example of applications which require ongoing relationships. For example, consider a web shopping application, where a user at a client browser may provide his user identifier ("user ID") and password to a particular instance of the web application executing on a particular server and then shops for merchandise. The user's browser may transmit a number of separate—but related—Hypertext Transfer Protocol ("HTTP") request messages, each of which is carried on a separate TCP connection request, while using this web application. Separate request messages may be transmitted as the user browses an on-line catalog, selects one or more items of merchandise, places an order, provides payment and shipping information, and finally confirms or cancels the order. In order to assemble and process the user's order, it is necessary to maintain state information (such as the user's ID, requested items of merchandise, etc.) until the shopping transaction is complete. It is therefore necessary to route all of the related connection requests to the same application instance because this state information exists only at that particular web application instance. Thus, the workload balancing implementation must account for on-going relationships of this type and subject only the first connection request to the workload balancing process.

Another example of applications which require persistent relationships between a particular client and a particular server is an application in which the client accesses security-sensitive or otherwise access-restricted web pages. Typically, the user provides his ID and password on an early connection request (e.g. a "log on" request) for such applications. This information must be remembered by the application and carried throughout the related requests without requiring the user to re-enter it. It is therefore necessary to route all subsequent connection requests to the server application instance which is remembering the client's information. The workload balancing implementation must therefore bypass its normal selection process for all but the initial one of the connection requests, in order that the on-going relationship will persist.

The need to provide these persistent relationships is often referred to as "server affinity" or "the sticky routing problem". One technique that has been used in the prior art to address this problem for web applications is use of "cookies". A "cookie" is a data object transported in variable-length fields within HTTP request and response headers. A cookie stores certain data that the server application wants to remember about a particular client. This could include client identification, parameters and state information used in an on-going transaction, user preferences, or almost anything else an application writer can think of to include. Cookies are normally stored on the client device, either for the duration of a transaction (e.g. throughout a customer's electronic shopping interactions with an on-line merchant via a single browser instance) or permanently. A web application may provide identifying information in the cookies it transmits to clients in response messages, where the client then returns that information in subsequent request messages. In this manner, the client and server application make use of connection-oriented information in spite of the connection-less model on which HTTP was designed.

However, there are a number of drawbacks to using cookies. First, transmitting the cookie information may increase packet size and may thereby increase network traffic. Second, one can no longer rely on cookies as a means of maintaining application state information (such as client identity) across web transactions. Certain client devices are incapable of storing cookies; these include wireless pervasive devices (such as web phones, personal digital assistants or "PDAs", and so forth), which typically access the Internet through a Wireless Application Protocol ("WAP") gateway using the Wireless Session Protocol ("WSP"). WSP does not support cookies, and even if another protocol was used, many of these devices have severely constrained memory and storage capacity, and thus do not have sufficient capacity to store cookies. Furthermore, use of cookies has raised privacy and security concerns, and many users are either turning on "cookie prompting" features on their devices (enabling them to accept cookies selectively, if at all) or completely disabling cookie support.

Other types of applications may have solutions to the sticky routing problem that depend on client and server application cooperation using techniques such as unique application-specific protocols to preserve and transfer relationship state information between consecutive connection lifetimes. For example, the Lotus Notes® software product from Lotus Development Corporation requires the client application to participate, along with the server application, in the process of locating the proper instance of a server application on which a particular client user's e-mail messages are stored. ("Lotus Notes" is a registered trademark of Lotus Development Corporation.) In another cooperative technique, the server application may transmit a special return address to the client, which the client then uses for a subsequent message.

In general, a client and server application can both know when an on-going relationship (i.e. a relationship requiring multiple connections) starts and when it ends. However, the client population for popular applications (such as web applications) is many orders of magnitude greater than the server population. Thus, while server applications might be re-designed to explicitly account for on-going relationships, it is not practical to expect that existing client software would be similarly re-designed and re-deployed (except in very limited situations), and this approach is therefore not a viable solution for the general case.

The sticky routing problem is further complicated by the fact that multiple TCP connections are sometimes established in parallel from a single client, so that related requests can be made and processed in parallel (for example, to more quickly deliver a web document composed of multiple elements). A typical browser loads up to four objects concurrently on four simultaneous TCP connections. In applications where state information is required or desirable when processing parallel requests, the workload balancing implementation cannot be allowed to independently select a server to process each connection request.

One prior art solution to the sticky routing problem in networking environments which perform workload balancing is to establish an affinity between a client and a server by configuring the workload balancing implementation to perform special handling for incoming connection requests from a predetermined client IP address (or perhaps a group of client IP addresses which is specified using a subnet address). This configuring of the workload balancer is typically a manual process and one which requires a great deal of administrative work. Because it is directed specifically to a known client IP address or subnet, this approach does not scale well for a general solution nor does it adapt well to dynamically-determined client IP addresses which cannot be predicted accurately in advance. Furthermore, this configuration approach is static, requiring reconfiguration of the workload balancer to alter the special defined handling. This static specification of particular client addresses for which special handling is to be provided may result in significant workload imbalances over time, and thus this is not an optimal solution.

In another approach, different target server names (which are resolved to server IP addresses) may be statically assigned to client populations. This approach is used by many nationwide Internet Service Providers ("ISPs"), and requires configuration of clients rather than servers.

Another prior art approach to the sticky routing problem in networking environments which perform workload balancing is to use "timed" affinities. Once a server has been selected for a request from a particular client IP address (or perhaps from a particular subnet), all subsequent incoming requests that arrive within a predetermined fixed period of time (which may be configurable) are automatically sent to that same server. However, the dynamic nature of network traffic makes it very difficult to accurately predict an optimal affinity duration, and use of timed affinities may therefore result in serious inefficiencies and imbalances in the workload. If the affinity duration is too short, then the relationship may be ended prematurely. If the duration is too long, then the purpose of workload balancing is defeated. In addition, significant resources may be wasted when the affinity persists after it is no longer needed.

SUMMARY OF THE INVENTION

Embodiments of the present invention provide for assigning connections from a client to respective ones of a plurality of application instances that receive data from a shared communication protocol stack. An affinity between the client and a corresponding one of the plurality of application instances is defined. Connection requests received from the client at the shared communication protocol stack are assigned to the corresponding one of the plurality of application instances if an affinity is defined between the client and the corresponding one of the plurality of application instances. Connection requests received from the client at the shared communication protocol stack are distributed to selected ones of the plurality of application instances if an affinity is not defined between the client and the corresponding one of the plurality of application instances.

In further embodiments of the present invention, defining an affinity between the client and a corresponding one of the plurality of application instances is provided by dynamically defining an affinity based on receipt of a previous connection request from the client. Furthermore, defining an affinity between the client and a corresponding one of the plurality of application instances may be provided by receiving from the one of the plurality of application instances an indication of an affinity for connection requests from the client.

In particular embodiments of the present invention, the affinity is defined based on a source identification of the client and a destination identification of connection requests from the client. The source identification of the client may be an Internet Protocol (IP) address of the client and the destination identification of the connection requests from the client may be an IP address and port of the connection requests.

In still further embodiments of the present invention, assigning connection requests received from the client at the shared communication protocol stack to the corresponding one of the plurality of application instances if an affinity is defined between the client and the corresponding one of the plurality of application instances is provided by providing connection requests received from the client to a listening socket associated with the corresponding one of the plurality of application instances. Distributing connection requests from the client at the shared communication protocol stack to selected ones of the plurality of application instances if an affinity is not defined between the client and the corresponding one of the plurality of application instances may be provided by providing connection requests received from the client to a listening socket associated with a selected one of the plurality of application instances.

In additional embodiments of the present invention, the shared communication protocol stack is a target communication protocol stack in a sysplex. In such embodiments, affinity definitions associated with one of the plurality of application instances may be identified to a routing communication protocol stack of the sysplex so that subsequent connection requests associated with the affinity definition are provided to the target communication protocol stack.

As will further be appreciated by those of skill in the art, while described above primarily with reference to method aspects, the present invention may be embodied as methods, apparatus/systems and/or computer program products.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. However, the present invention should not be construed as limited to use in systems such as those illustrated in FIGS. 1 and 3 but may be used in any system utilizing application instance level workload distribution.

Embodiments of the present invention may utilize affinity techniques such as those described in commonly assigned U.S. Patent Publication Nos. US2002/0143965A1 and US2002/0143953A1, both published Oct. 3, 2002, the disclosures of which are incorporated herein as if set forth in their entirety, for multiple application instances on a single data processing system.

Embodiments of the present invention may provide techniques for improving the handling of related connection request messages in networking environments that use workload distribution, such as workload balancing (which may be referred to equivalently as "load balancing"), to distribute workload between multiple application instances on a data processing system, such as a server. Because bypassing the workload balancing function may lead to an overall system in which the workload distribution is out of balance, the disclosed techniques are defined to enable the bypass to occur only when needed by a particular application instance. Thus, incoming connection requests which do not need this special handling are subjected to workload balancing, thereby enabling the workload to be shared among the application instances on the server in a manner that dynamically reacts to the changing networking environment.

In particular embodiments of the present invention, individual ones of the multiple instances of a particular application may determine dynamically, at run time, whether a relationship with a particular source (e.g. a particular client or subnet) is expected to comprise multiple successive connection requests, and then to specify that those successive requests should be directed to this same application instance on the data processing system. In certain embodiments of the present invention, the affinity has a maximum duration, after which the affinity is ended and the resources used to maintain the affinity can be released. A timeout mechanism may be used for this purposes. A particular one of the multiple application instances may also be permitted to explicitly cancel an affinity, or to extend an affinity, using application-specific considerations. Extending an affinity may be useful in a number of situations. For example, an application instance might be aware that a significant amount of processing for a particular relationship has already occurred, and that it is likely that the processing for this relationship is nearly finished. By extending an affinity, it may be possible to complete the processing (and thereby avoid the inefficiencies encountered in prior art systems which use fixed-duration timed affinities). The ability to cancel an affinity (either explicitly, or because its maximum duration has been exceeded) is especially beneficial in situations where the on-going relationship with the client ends unexpectedly (e.g. because the client application fails, or the user changes his mind about continuing). It may also be desirable to cancel an affinity based upon messages received from the client which indicate that the persistent relationship is no longer necessary.

In additional embodiments of the present invention, instances of a particular server application may specify that connection requests originating from a particular client (and optionally, from specific ports on that client) are to be automatically routed to the same instance of this server application if that instance is currently handling other such requests from the same client. As with the previously described embodiments of the present invention, the first of the related connection requests may be subjected to normal workload balancing.

Figure 1:
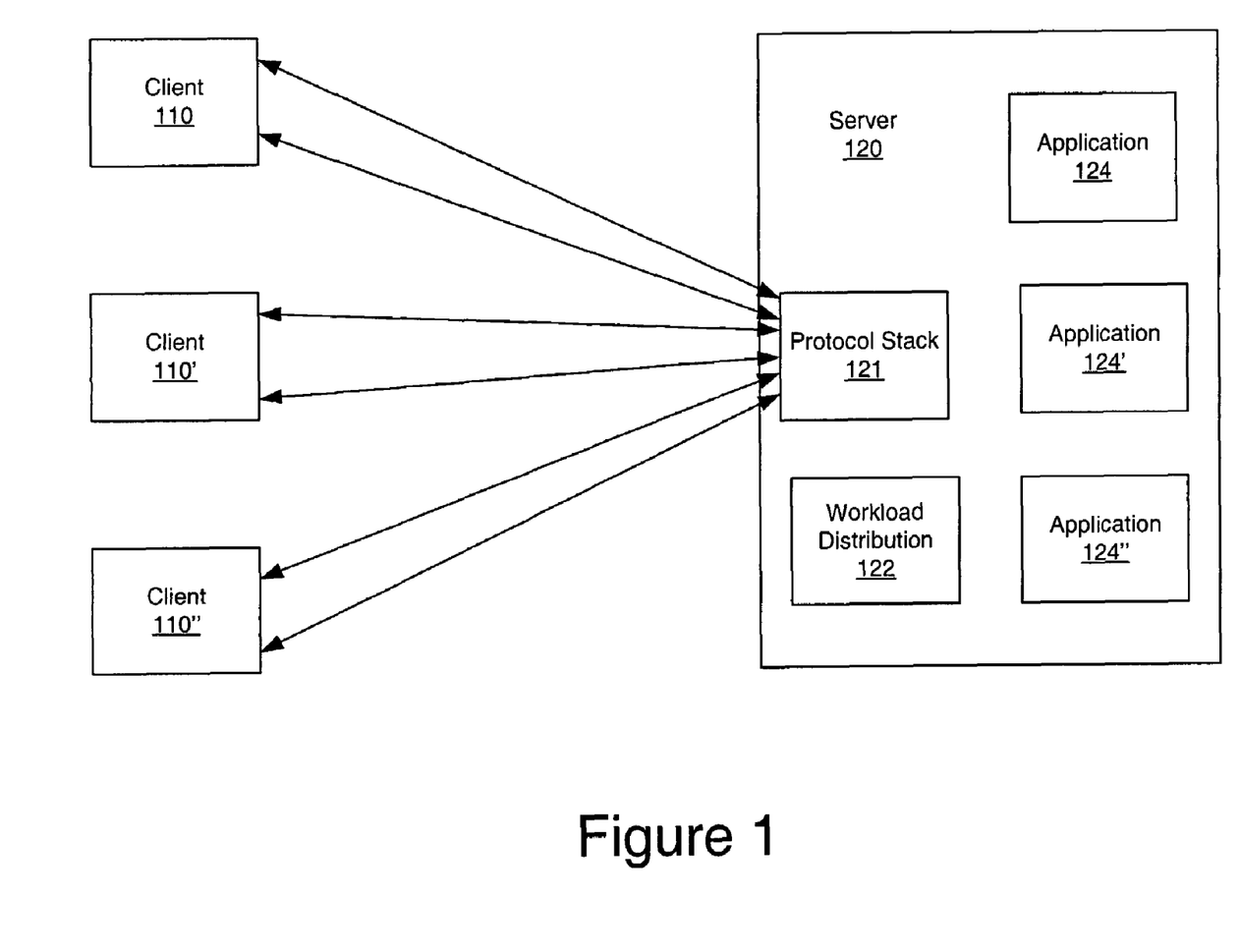
FIG. 1 is a block diagram of a system incorporating application instance level affinity according to embodiments of the present invention.

FIG. 1 illustrates an exemplary system incorporating embodiments of the present invention. As seen in FIG. 1, a plurality of client processors 110, 110' and 110" establish communication connections to a communication protocol stack 121 of a server 120. The server 120 includes a plurality of instances of the same application 124, 124' and 124" that share the communication protocol stack 121 and a workload distribution function 122 that distributes communications from the connections to the shared communication protocol stack 121 between the instances of the application 124, 124' and 124". The client processors 110, 110' and 110" may be any type of data processing system capable of establishing a communication connection to another data processing system, including, for example, general purpose data processing systems, such as personal computers, laptop computers or the like, personal data assistants, data enabled telephones or other pervasive computing devices as well as custom data processing systems such as point of sale terminals, test equipment, monitoring equipment or the like. Likewise, the server 120 may be any type of data processing system capable of supporting multiple instances of a same application and carrying out the operations described herein for providing affinity for client connections.

While embodiments of the present invention are described with reference to the particular system configuration illustrated in FIG. 1, as will be appreciated by those of skill in the art, other configurations may also be utilized while still benefitting from the teachings of the present invention. Thus, the present invention should not be construed as limited to the configuration of FIG. 1 but is intended to encompass any configuration capable of carrying out the operations described herein.

Figure 2:
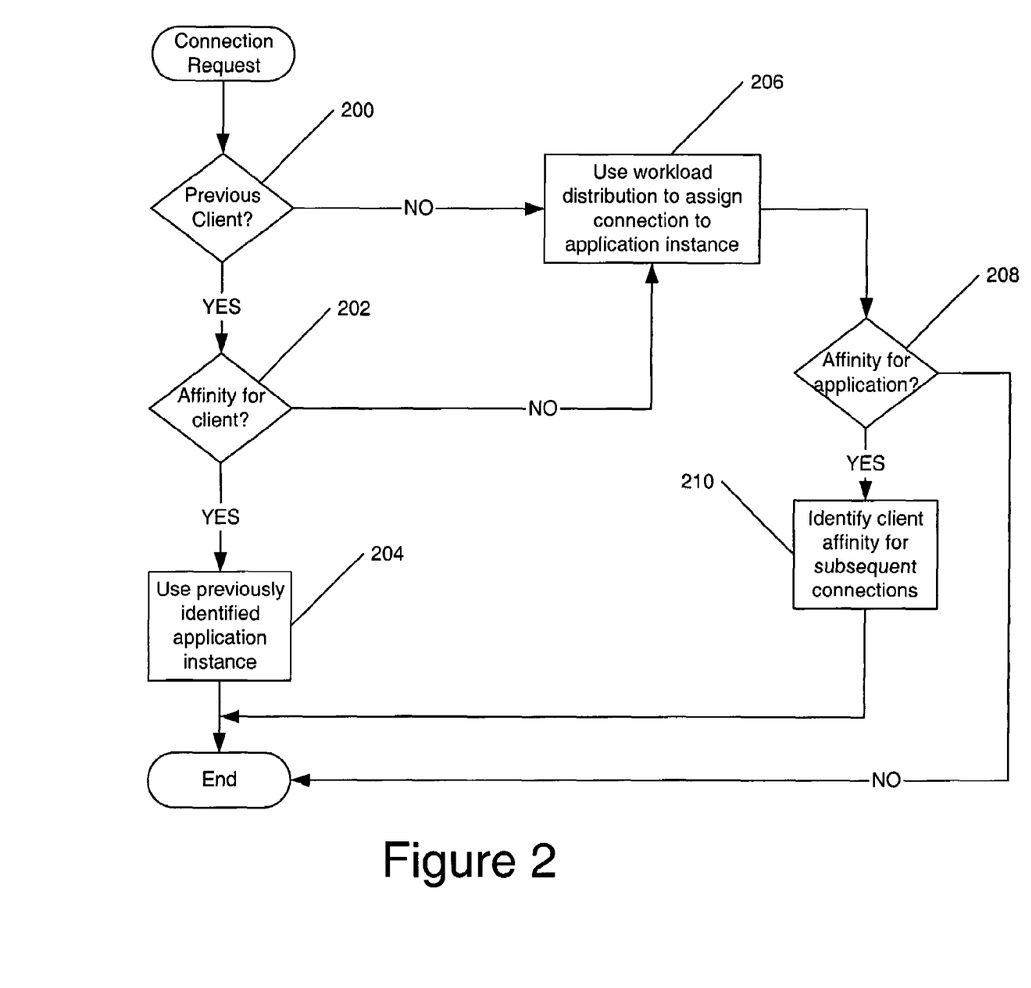
FIG. 2 is a flowchart illustrating operations according to embodiments of the present invention.

Operation of the server 120 according to embodiments of the present invention are illustrated in FIG. 2. When a client, such as client 110, requests a connection to the server 120 utilizing the communication protocol stack 121 the connection is established and the workload distribution function 122 determines to which of the application instances 124, 124' or 124" bound to the shared communication protocol stack 121 the communications for the connection will be provided. Thus, as seen in FIG. 2, the workload distribution function 122 determines if the connection request is from a previous client (block 200). A previous client may be a client for which there already exists a connection to the communication protocol stack 121 or for which a connection recently existed (e.g. was previously established and terminated within a predefined time period).

If the connection request is not from a previous client (block 200), then conventional workload balancing techniques, such as round-robin or more sophisticated techniques, may be used to assign the connection to a particular one of the application instances 124, 124' and 124" (block 206). Such a routing of communications for the connection may be provided, for example, by maintaining a connection routing table and updating the connection routing table to reflect that the connection from the client source address to the destination address and port are to be routed to a unique listening socket associated with a particular application instance.

workload distribution function 122 may also check to see if client affinity has been defined as applying to the application to which the client is communicating (block 208). Such an identification of the applicability of affinity to a client may be predefined or dynamically established. For example, for a particular application, affinity may be established for all clients for all subsequent connections or for connections to a particular port or group of ports. Alternatively or in addition, affinity could be specified by an application to the workload distribution function once a particular communication has been received. For example, connection requests from the same client could be distributed using the workload distribution function prior to receiving a "login" communication from the client and then affinity established for connections subsequent to a successful "login" communication sequence. In any event, if client affinity is specified for the client (block 208), the client affinity is identified for subsequent connections (block 210), for example, by maintaining an affinity table and adding client identification information to the affinity table. The client affinity table may also be incorporated with the connection routing table described above. Otherwise, operations for processing the connection by the workload distribution function 122 continue in a conventional manner.

If the connection request is from a previous client (block 200), then it is determined if client affinity is defined for the client requesting the connection (block 202). If client affinity has not been defined (block 202), conventional workload balancing may be used to assign the connection to a particular one of the application instances 124, 124' and 124" (block 206). If client affinity has been defined for the client connection request (block 202), then the conventional workload balancing may be bypassed and the connection assigned to the specific application instance specified by the client affinity (block 204). As discussed above, client affinity may be defined on a per client basis or on a per connection request basis and may be statically or dynamically defined. Furthermore, the client affinity may be defined for a predefined time period, which may be extended, for a predefined number of connection requests, and/or for all subsequent connection requests. Thus, for example, the workload distribution function 122 may interrogate a client affinity table to determine if an entry exists for a client based on a client source identification, such as a source address, as well as determining if an entry exists corresponding to a destination identification for the connection, such as a destination address and/or port for the connection. The workload distribution function 122 may also determine if the connection request falls within a predefined time and/or number of connections such the client affinity is active. Alternatively the client affinity information could be periodically evaluated and inactive client affinity information removed such that the client affinity table only contains client affinity information for valid affinities.

As an example, with reference to FIG. 1, if client 110 sends an initial connection request to the server 120, the shared communication protocol stack 121 receives the connection request and the workload distribution function 122 determines which of the application instances 124, 124' or 124" is to receive the communications associated with the requested connection. Because it is an initial connection request, the workload distribution function 122 selects one of the application instances 124, 124' or 124" utilizing convention workload distribution techniques. Thus, the application instance 124 may be selected. A connection routing table may be updated to reflect that communications for the connection are to be routed to the listening socket of associated with the application instance 124. When a subsequent connection request from the client 110 is received, if client affinity is specified for the client 110, then the workload distribution function 122 would bypass the conventional distribution of the communications for the connection and would assign the connection to the application instance 124 based on client affinity being specified for the client 110. Thus, workload distribution and affinity may be provided for multiple instances of an application executing on a single processor and/or sharing a communication protocol stack.

Figure 3:
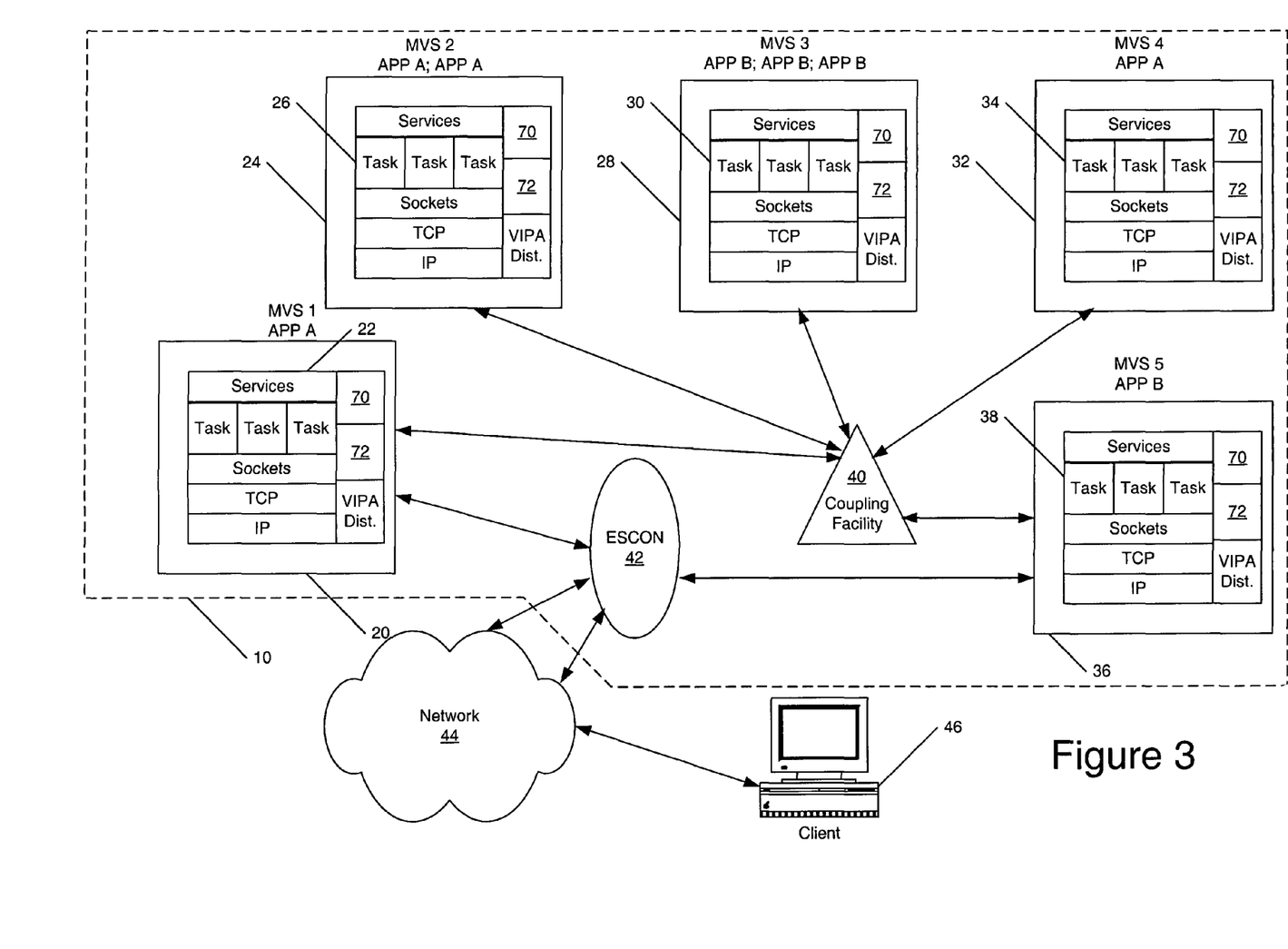
FIG. 3 is a block diagram of a sysplex incorporating application level affinity according to further embodiments of the present invention.

Further embodiments of the present invention may operate in a networking environment such as that depicted in FIG. 3. A plurality of data processing systems 20, 24, 28, 32 and 36 are shown as interconnected. This interconnection is referred to herein as a "sysplex", and is denoted as element 10. The example environment in FIG. 3 illustrates how the present invention may be used with IBM's Sysplex Distributor. However, the teachings disclosed herein may be used advantageously in other networking environments as well, and it will be obvious to one of ordinary skill in the art how these teachings may be adapted to such other environments.

The data processing systems 20, 24, 28, 32 and 36 may be operating system images, such as MVS™ images, which execute on one or more computer systems. ("MVS" is a trademark of IBM.) While the present invention will be described primarily with reference to the MVS operating system executing in an OS/390 and/or z/OS environment, the data processing systems 20, 24, 28, 32 and 36 may be mainframe computers, mid-range computers, servers, or other systems capable of supporting the affinity techniques disclosed herein. Accordingly, the present invention should not be construed as limited to the Sysplex Distributor environment or to data processing systems executing MVS or using OS/390.

As is further illustrated in FIG. 3, the data processing systems 20, 24, 28, 32 and 36 have associated with them communication protocol stacks 22, 26, 30, 34, and 38, which for purposes of the preferred embodiments are preferably TCP/IP stacks. As is further seen in FIG. 3, a data processing system, such as system 32, may incorporate multiple communication protocol stacks (shown as stacks 34 and 38 in this example). The communication protocol stacks 22, 26, 30, 34, 38 have been modified to incorporate affinity management logic as described herein.

While each of the communication protocol stacks 22, 26, 30, 34, 38 illustrated in FIG. 3 are assumed to incorporate the affinity handling logic 70, it is not strictly required that all such stacks in a sysplex or networking environment incorporate this logic. Thus, the advantages of the present invention may be realized in a backward-compatible manner, whereby any stacks which do not recognize the affinity messages defined herein may ignore those messages.

As is further seen in FIG. 3, the communication protocol stacks 22, 26, 30, 34, 38 may communicate with each other through a coupling facility 40 of sysplex 10. An example of communicating through a coupling facility is the facility provided by the MVS operating system in a System/390 Parallel Sysplex, and known as "MVS XCF Messaging", where "XCF" stands for "Cross-Coupling Facility". MVS XCF Messaging provides functions to support cooperation among authorized programs running within a sysplex. When using XCF as a collaboration facility, the stacks preferably communicate with each other using XCF messaging techniques. Such techniques are known in the art, and will not be described in detail herein. The communication protocol stacks 22, 26, 30, 34, 38 may also communicate with an external network 44 such as the Internet, an intranet or extranet, a Local Area Network (LAN), and/or a Wide Area Network (WAN). In an MVS system, an Enterprise Systems Connection ("ESCON") 42 or other facility may be used for dynamically connecting the plurality of data processing systems 20, 24, 28, 32 and 36. A client 46 may, therefore, utilize network 44 to communicate with an application on an MVS image in sysplex 10 through the communication protocol stacks 22, 26, 30, 34, 38.

In particular embodiments of the present invention, each of the communication protocol stacks 22, 26, 30, 34, 38 has associated therewith a list of addresses (such as IP addresses) for which that stack is responsible. Also, each data processing system 20, 24, 28, 32 and 36 or MVS image may have associated therewith a unique identifier within the sysplex 10. At initialization of the communication protocol stacks 22, 26, 30, 34, 38, the stacks are preferably configured with the addresses for which that stack will be responsible, and are provided with the identifier of the MVS image of the data processing system.

Note that while destination addresses within the sysplex are referred to herein as "IP" addresses, these addresses are preferably a virtual IP address of some sort, such as a Dynamic Virtual IP Address ("DVIPA") of the type described in U.S. Pat. No. 6,996,631, which is assigned to IBM and is entitled "Methods, Systems and Computer Program Products for Cluster Workload Distribution", the disclosure of which is incorporated herein by reference as if set forth in its entirety, or a loopback equivalent to a DVIPA, whereby the address appears to be active on more than one stack although the network knows of only one place to send IP packets destined for that IP address. As taught in the DVIPA patent, an IP address is not statically defined in a configuration profile with the normal combination of DEVICE, LINK, and HOME statements, but is instead created as needed (e.g. when needed by Sysplex Distributor).

A workload balancing function such as Workload Management ("WLM"), which is used in the OS/390 and/or z/OS TCP/IP implementation for obtaining run-time information about system load and system capacity, may be used for providing input that is used when selecting an initial destination for a client request using workload balancing techniques. Such workload balancing functions may be provided by a routing protocol stack as described in U.S. Pat. No. 6,996,631).

As further illustrated in FIG. 3, a single protocol stack of an MVS image may have multiple instances of a same application executing and utilizing the common protocol stack. For example, the protocol stack 26 of MVS2 is illustrated as providing the protocol stack for two instances of APP A. Similarly, the protocol stack 30 of MVS3 is illustrated as providing the protocol stack for three instances of APP B. In such a case, a workload distribution function 70 may be associated with the protocol stack and may utilize client affinity information 72 so as to selectively utilize the workload distribution function to select application instances for connection requests from a client, such as the client 46.

Furthermore, in managing affinities, an entry may be added to the connection routing hash table (CRHT) on the routing stack and on the hosting target stack. The entry may designate an affinity between the client (source IP address in the connection request) and the server. In the routing stack, the affinity designates the hosting target stack by unique IP address, as it would with conventional connection balancing systems, such as Cisco MNLB or WebSphere Edge Server Network Dispatcher. On the target stack, the entry designates a particular application instance listening socket queue. When a connection request arrives at the target stack, the CRHT is first searched for a matching entry, which, typically, is not found under normal circumstances. The CRHT is then searched for an affinity entry, not considering client (source) port. If an affinity match occurs, the connection request is allocated to the designated instance listening socket. If no affinity match occurs, the connection request is then allocated to one of the listening server instances to balance active connections among the instances. An affinity entry may be stored in the target stack CRHT. Such affinity information may be maintained on the target stack even when there is only one active listening server application instance. Thus, allowing another instance to be started at any time. Client affinities to the existing are maintained even after a new instance is started.

When a routing stack outage occurs, the target stack communicates its entire CRHT to the backup routing stack, including affinities. The receiving backup stack stores active connection and affinity entries in its overall routing CRHT, designating both connection entries and affinities as pointing to the hosting target stack that sent the entry to the backup routing stack. In such a way, affinities may be maintained even in the presence of a routing stack failure.

As described above, embodiments of the present invention may provide collaborating communication protocol stacks, such as TCP stacks, that maintain affinities to specific instances of an application in a two stage manner: first by routing connection requests to the proper target stack and then by routing the connection requests from the client to the proper listening server instance. This allows multiple instances of the server application to be hosted on a single operating system and TCP/IP stack. Such a system may make more efficient use of system resources while ensuring proper application function by maintaining affinities between specific clients and the respective specific server instances.

Figure 4:
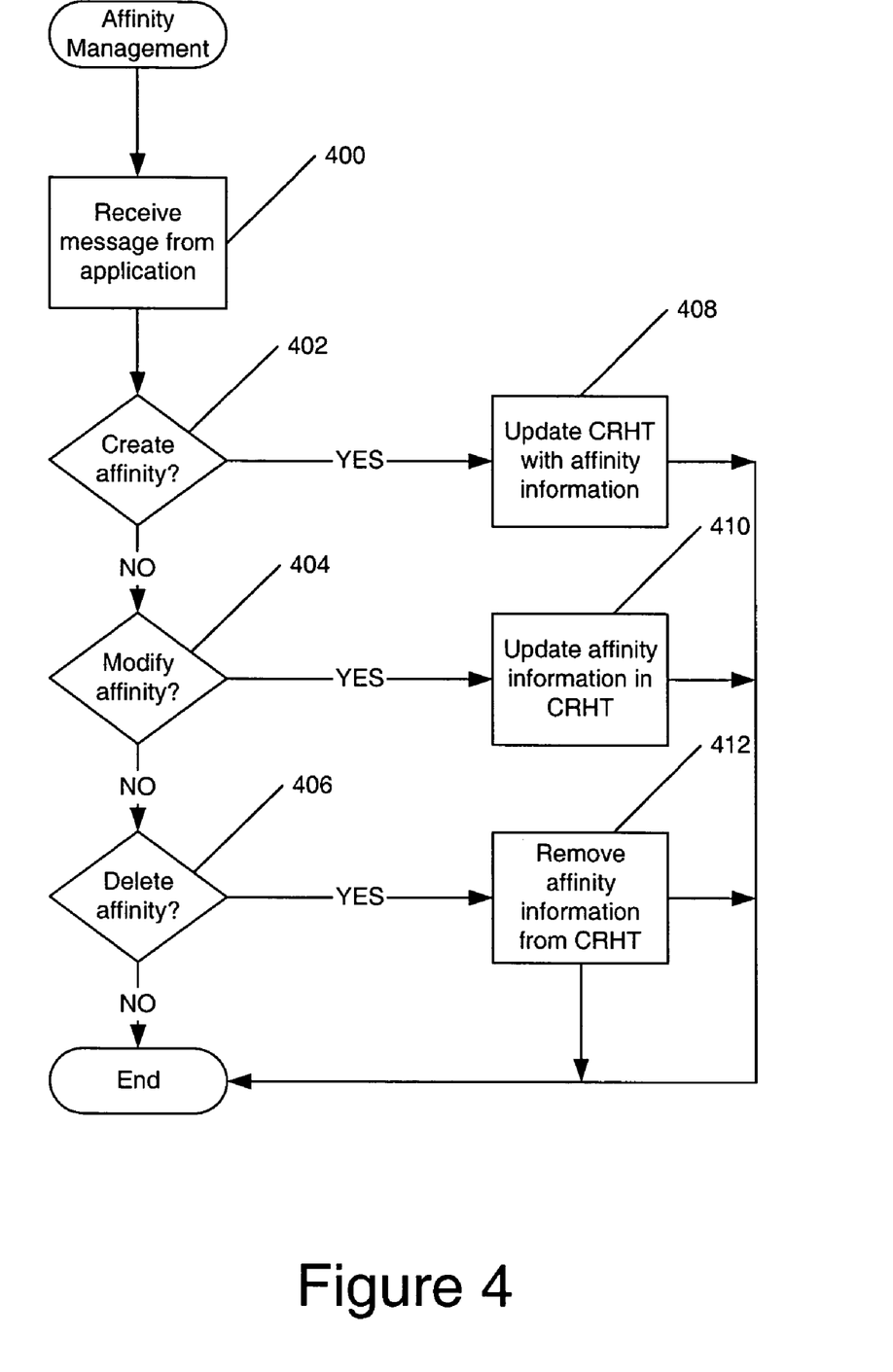
FIG. 4 is a flowchart illustrating operations according to particular embodiments of the present invention.

FIG. 4 illustrates operations according to particular embodiments of the present invention for dynamically managing affinity information associated with a communication protocol stack based on application specification of affinity information and/or routing communication protocol stack specification of affinity information. Such operations may, for example, be carried out by the communication protocol stack 26, 30 and/or the workload distribution function 70. As seen in FIG. 4, a message is received from the application instance, such as APP A or APP B, or may be received from a routing communication protocol stack, by the protocol stack 26, 30 or work load distribution function 70 that manages affinity information 72 (block 400). Such messaging may be based on the messaging described in United States Published Patent Application Nos. US2002/0143965A1 and US2002/0143953A1. The message is evaluated to determine if the message creates an affinity associated with a client (block 402). If the message is to create an affinity (block 402) then affinity information in a connection routing hash table (CRHT) of the communication protocol stack is updated to reflect the affinity for connections from a client (block 408). An entry indicating that client affinity applies to a particular source IP address, destination IP address and destination port may be made in CRHT. Thus, the entry indicates that subsequent connection requests from the same triple of source IP address, destination IP address and destination port will be routed to the same application instance. The affinity indication may specify a temporal limit, a number of connection requests for the affinity and/or a particular characteristic of the connection requests for which affinity applies. Furthermore, the affinity information may also apply to multiple connection requests from a client and may be specified, for example, using wildcards, such as for the destination port identification.

If the message is not to create an affinity (block 402), the message is evaluated to determine if it is to modify existing affinity information (block 404). If the message is to modify existing affinity information (block 404), the CRHT is updated with the modified information (block 410). If the message is not to modify existing affinity information (block 404), the message is evaluated to determine if it is to delete existing affinity information (block 406). If the message is to delete existing affinity information (block 406), the affinity information is removed from the CRHT (block 412).

Operations illustrated in FIG. 4 may provide for the dynamic creation and/or management of affinities. Static affinities may also be provided.

Figure 5:
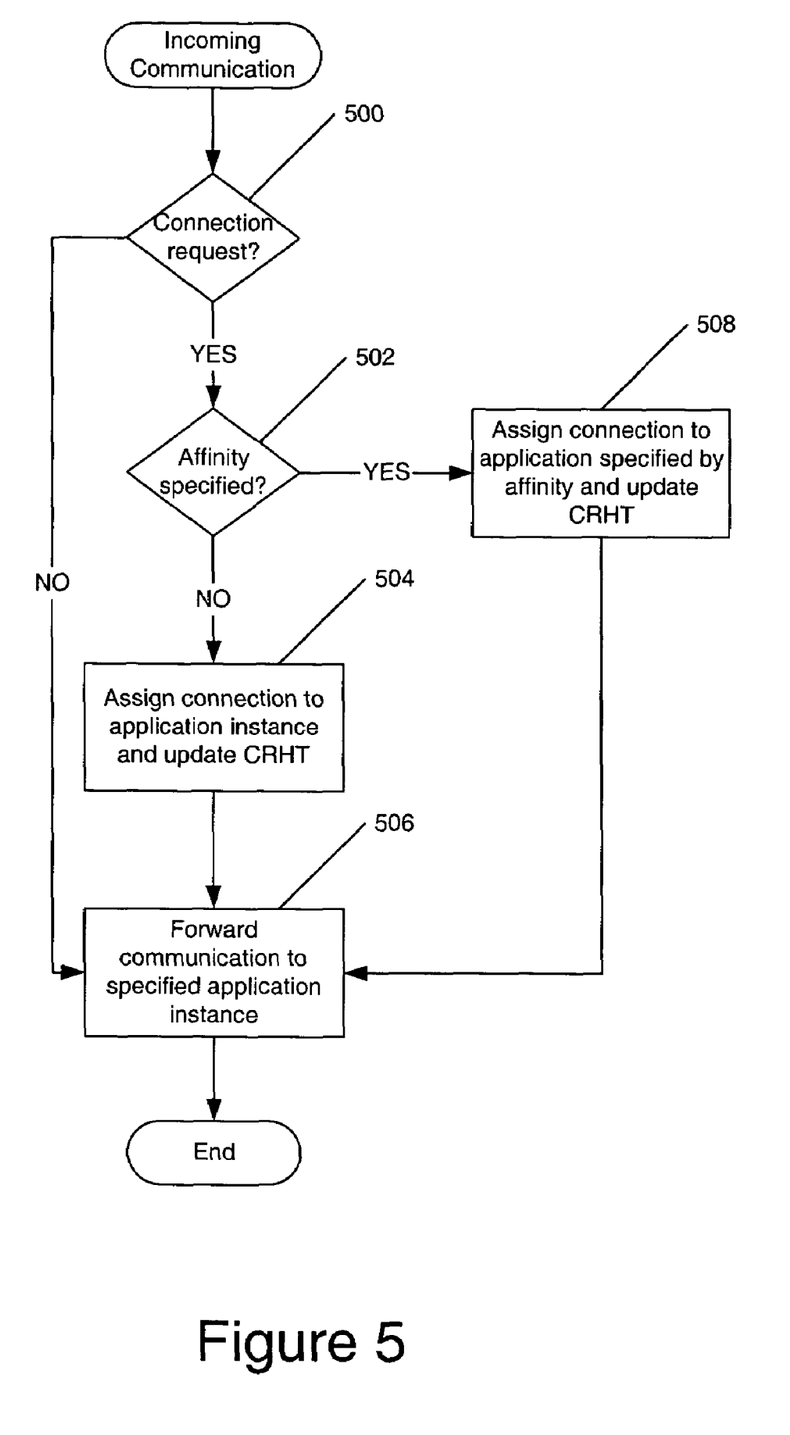
FIG. 5 is a flowchart illustrating further operations according to particular embodiments of the present invention.

FIG. 5 is a flowchart illustrating operations of the communication protocol stack incorporating embodiments of the present invention. As seen in FIG. 5, when a communication from a client is received by the communication protocol stack, the communication is evaluated to determine if it is a connection request (block 500). If the communication is not a connection request (block 500), then an entry in the CRHT already exists for the communication and the communication is forwarded to the application instance specified by the CRHT entry corresponding to the client source address and the destination IP address and port (block 506).

If the communication is a connection request (block 500), it is determined if affinity is specified for the connection requests from the client (block 502). Such a determination may be made searching the CRHT for an affinity entry not considering the client (source) port. If an entry exists, then affinity is specified for the connection request. If affinity is specified for the connection request (block 502), the connection is assigned to the specified listening socket of the application instance and the CRHT may be updated to reflect such an assignment for future communications (block 508). The connection request is forward to the specified application instance (block 506).

If affinity is not specified for the connection request (block 502), the connection an application instance is selected based on workload distribution and the connection is assigned to the listening socket of the selected application instance (block 504). The CRHT may also be updated to reflect such an assignment for future communications (block 504). Optionally, if affinity is specified for the application, an affinity entry may also be made in the CRHT. The connection request is forward to the specified application instance (block 506).

Figure 6:
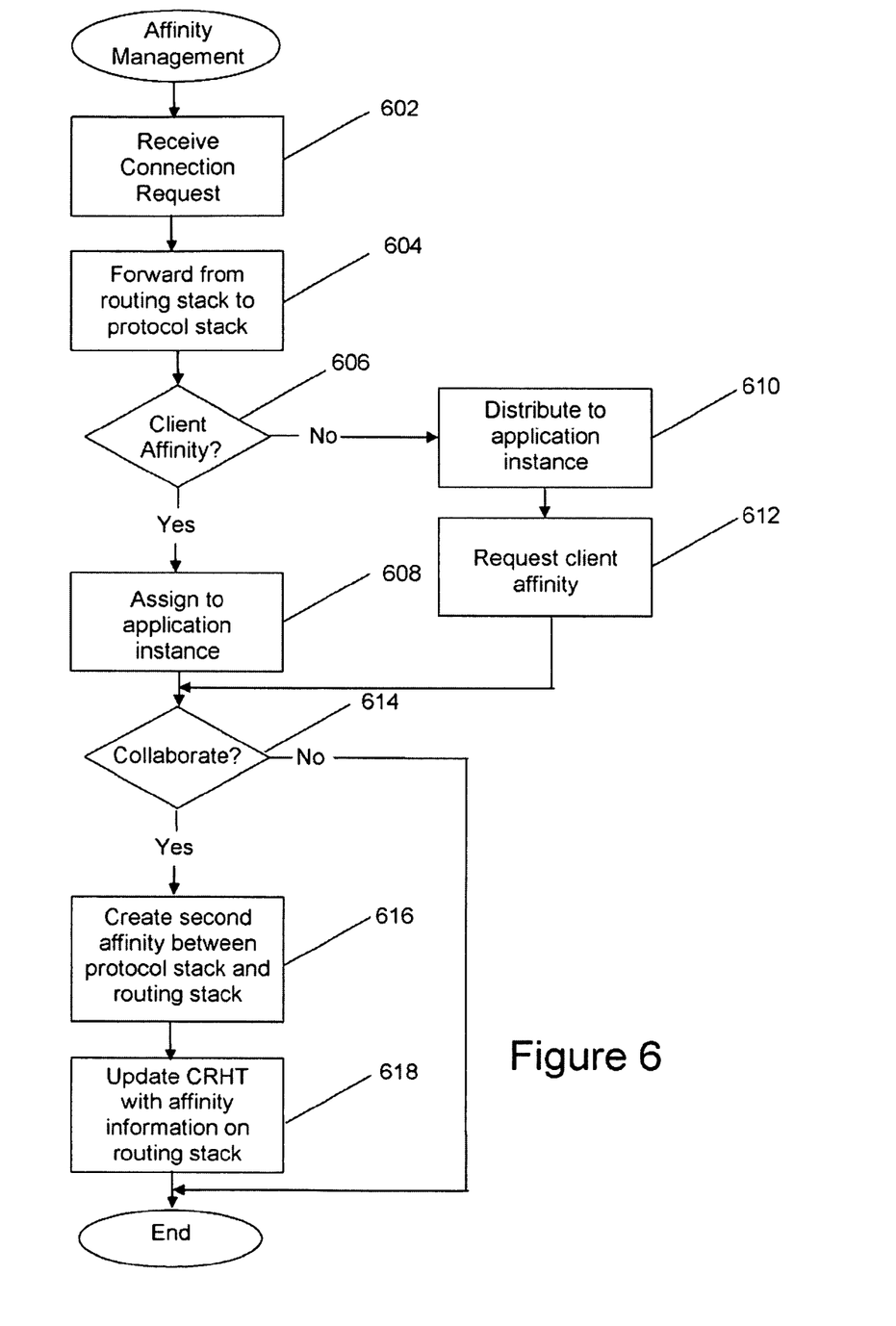
FIG. 6 is a flowchart of a method of assigning connections according to particular embodiments of the present invention.

FIG. 6 illustrates a method of assigning connections from a client to respective ones of a plurality of application instances that receive data from a shared communication protocol stack, according to particular embodiments of the present invention. A connection request is received from the client at a routing stack (block 602) and the connection request is forwarded from the routing stack to the shared communication protocol stack that is provided on a data processing system (block 604). If it is determined that a client affinity is defined between the client and a corresponding one of the plurality of application instances associated with the shared communication protocol stack (block 606), then the connection request received from the client at the shared communication protocol stack is assigned to the corresponding one of the plurality of application instances (block 608).

If it is determined that there is no client affinity defined between the client and a corresponding one of the plurality of application instances associated with the shared communication protocol stack, then the connection request received from the client at the shared communication protocol stack is distributed to a selected one of the plurality of application instances (block 610). In this regard, the selected one of the plurality of application instances is configured to generate a message (block 612) that requests the creation of client affinity for connection requests from the client if the selected one of the plurality of application instances determines that affinity for connection requests from the client is required.

If collaboration is required with the routing stack (block 614) then a message is utilized to establish a first affinity between the shared communication protocol stack and the selected one of the application instances and the creation of the first affinity causes the shared communication protocol stack to collaborate with the routing stack to create a second affinity between the routing stack and the shared communication protocol stack (block 616) such that subsequent connection requests received by the routing stack are forwarded to the shared communication protocol stack for as long as the second affinity exists. The first and second affinities may be established by adding an entry to a connection routing hash table (CRHT) on the routing stack and on the shared communication protocol stack each time a client affinity is created (block 618).

Figure 7:
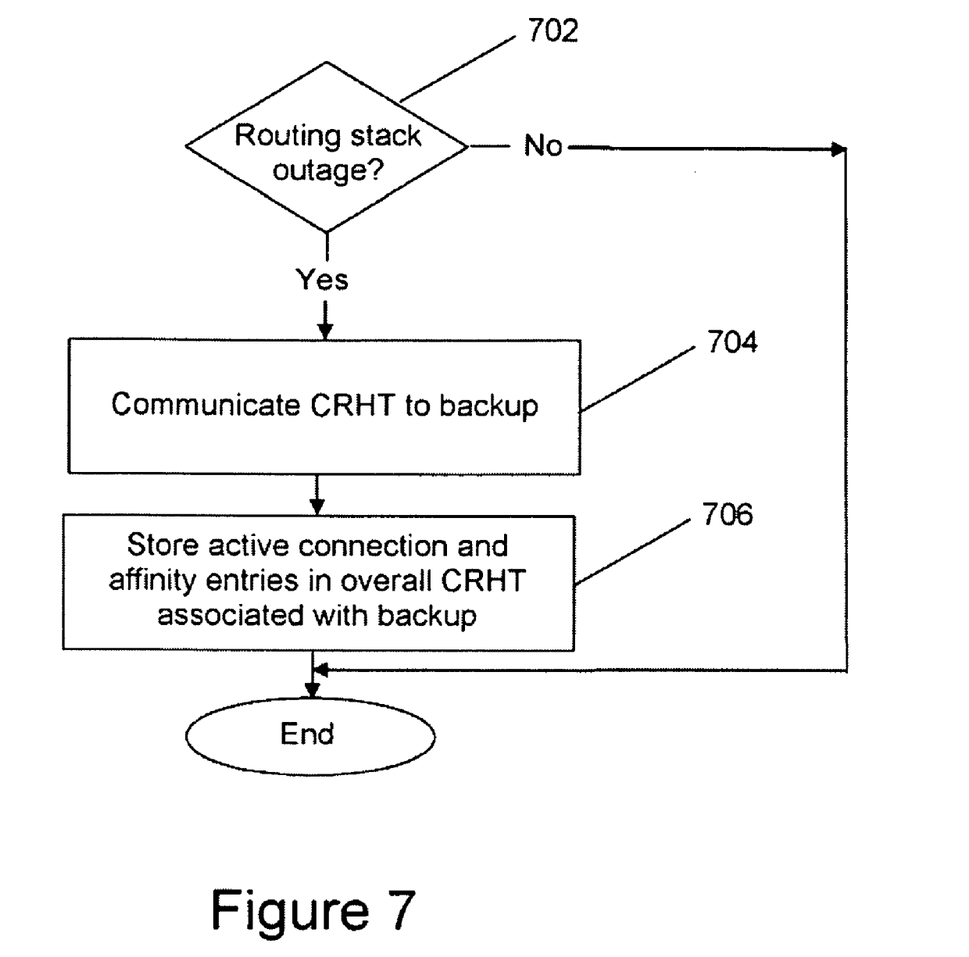
FIG. 7 is a flowchart of a method for addressing routing stack outages according to particular embodiments of the present invention.

FIG. 7 illustrates a method of dealing with routing stack outages. If a routing stack outage occurs (block 702) then the entire connection routing hash table, including affinities, is communicated from the shared communication protocol stack to a backup routing stack (block 704). In response thereto, the backup routing stack stores active connection and affinity entries in an overall routing CRHT associated with the backup routing stack, designating both connection entries and affinities as pointing to the shared communication protocol stack (block 706).

While embodiments of the present invention have been described with reference to maintaining and utilizing client affinity within a workload distribution function, as will be appreciated by those of skill in the art in light of the present disclosure, such client affinity control of the distribution of connections may be provided separate from a workload distribution function. Furthermore, while the workload distribution function 70 and client affinity information 72 are illustrated as part of a communication protocol stack, such functions and/or information may be provided separately from the communication protocol stack.

The flowcharts and block diagrams of FIGS. 1 through 5 illustrate the architecture, functionality, and operation of possible implementations of systems, methods and computer program products for application instance level affinities according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of assigning connections from a client to respective ones of a plurality of application instances that receive data from a shared communication protocol stack, comprising:

receiving a connection request from the client at a routing stack;

forwarding the connection request from the routing stack to the shared communication protocol stack that is provided on a data processing system;

determining if a client affinity is defined between the client and a corresponding one of the plurality of application instances associated with the shared communication protocol stack;

assigning the connection request received from the client at the shared communication protocol stack to the corresponding one of the plurality of application instances if client affinity is defined between the client and the corresponding one of the plurality of application instances; and distributing the connection request received from the client at the shared communication protocol stack to a selected one of the plurality of application instances if no client affinity is defined between the client and the corresponding one of the plurality of application instances;

wherein the selected one of the plurality of application instances is configured to generate a message that requests the creation of client affinity for connection requests from the client if the selected one of the plurality of application instances determines that affinity for connection requests from the client is required, the message utilized to establish a first affinity between the shared communication protocol stack and the selected one of the application instances;

wherein the creation of the first affinity causes the shared communication protocol stack to collaborate with the routing stack to create a second affinity between the routing stack and the shared communication protocol stack such that subsequent connection requests received by the routing stack are forwarded to the shared communication protocol stack for as long as the second affinity exists;

wherein establishing the first and second affinities comprises adding an entry to a connection routing hash table (CRHT) on the routing stack and on the shared communication protocol stack each time a client affinity is created; and wherein the data processing system is further configured for communicating the entire connection routing hash table, including affinities, from the shared communication protocol stack to a backup routing stack if a routing stack outage occurs, wherein the receiving backup routing stack stores active connection and affinity entries in an overall routing CHRT associated with the backup routing stack, designating both connection entries and affinities as pointing to the shared communication protocol stack.

2. The method of claim 1, wherein determining if a client affinity is defined between the client and a corresponding one of the plurality of application instances comprises determining if a client affinity has been dynamically defined based on at least one of a per client basis or a receipt of a previous connection request from the client.

3. The method of claim 1, wherein the client affinity is defined based on a source identification of the client and a destination identification of the connection request from the client.

4. The method of claim 3, wherein the source identification of the client comprises an Internet Protocol (IP) address of the client and the destination identification of the connection requests from the client comprises an IP address and port of the connection requests.

5. The method of claim 1, wherein assigning the connection request from the client at the shared communication protocol stack comprises providing the connection request received from the client to a listening socket associated with the corresponding one of the plurality of application instances; and wherein distributing the connection request received from the client at the shared communication protocol stack comprises providing the connection request received from the client to a listening socket associated with a selected one of the plurality of application instances.

6. The method of claim 1, wherein the shared communication protocol stack comprises a target communication protocol stack in a sysplex, the method further comprising identifying affinity definitions associated with one of the plurality of application instances to a routing communication protocol stack of the sysplex so that subsequent connection requests associated with the affinity definition are provided to the target communication protocol stack.

* * * * *